Dec. 20, 1960     M. N. BRILLIS ET AL     2,965,274

PAPER COFFEE CUP

Filed Aug. 13, 1958

INVENTORS
MICHAEL N. BRILLIS
FRANK POLLICK
BY

*Edw. S. Higgins*

ATTORNEY

United States Patent Office 2,965,274
Patented Dec. 20, 1960

2,965,274

PAPER COFFEE CUP

Michael N. Brillis, 124 Riverdale Ave., and Frank Pollick, 439 Bellevue Ave., both of Yonkers, N.Y.

Filed Aug. 13, 1958, Ser. No. 754,848

1 Claim. (Cl. 229—1.5)

This invention relates to new and useful improvements in paper coffee cups.

When coffee is served in paper cups it is customary and necessary to supply to spoon for the purpose of stirring the sugar if and when sugar is used to sweeten the coffee. There are occasions when a spoon is not available or when it is not convenient or handy to supply a spoon. With this in view, it is the prime object of the present invention to provide a paper coffee cup that needs no spoon for stirring the sugar.

It is another object of the invention to provide a paper coffee cup with baffles on the bottom thereof for stirring the sugar placed in the coffee.

A further object of the invention is to provide a paper coffee cup with a stirring device for the sugar that is highly efficient in operation, simple in construction and economical to manufacture.

For further comprehension of the invention and of the objects and advantages thereof, reference will be had to the accompanying drawing forming a material part of this disclosure wherein—

Figure 1:
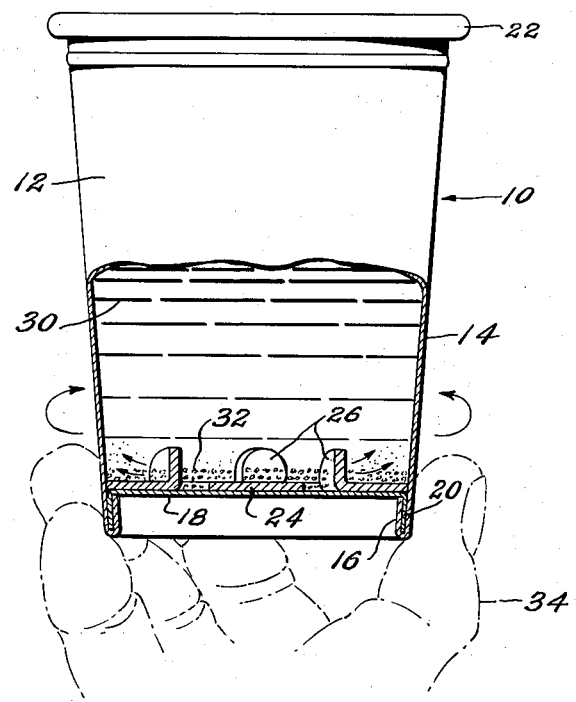
Fig. 1 is a side elevational view partly in section of a paper coffee cup embodying the present invention showing coffee and sugar therein and a hand of the user in stirring position in dash lines.
Figure 2:
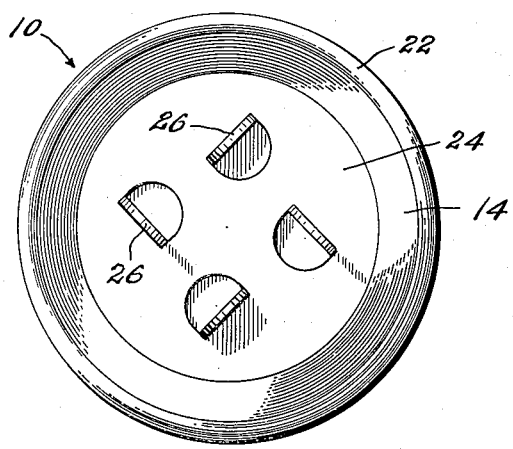
Fig. 2 is a top plan view of the cup.
Figure 3:
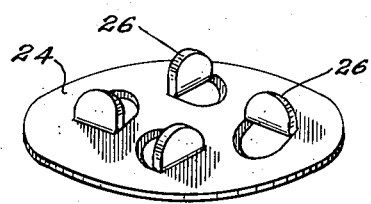
Fig. 3 is a perspective view of the baffle plate.

Referring in detail to the drawing, a paper coffee cup made in accordance with the present invention is shown in Fig. 1 and is designated by the reference numeral 10. The coffee cup comprises a cylindrical tapered body 12 formed of cardboard or pasteboard or similar semi-rigid paper and includes a side wall 14. The bottom end of the side wall is turned inwardly upon itself forming a flange 16 and forming a support for a bottom wall 18 which rests upon the top edge of the flange 16. The bottom wall has a flange 20 interposed between the bottom of the side wall and the flange 16. The body 12 is open at the top and is formed with a bead 22 thereat.

In accordance with the present invention, a disc 24 or plate of the same material as the body 12 is secured to the top surface of the bottom wall 18 in any suitable manner. The disc or plate 24 is formed with outstruck fins 26 forming baffles. Four of such baffles are shown equally spaced therearound and with the faces thereof disposed perpendicularly to each other.

In using the improved paper coffee cup, the liquid coffee 32 is poured into the cup and the sugar, indicated at 32, in Fig. 1, is placed on the disc or plate 24 in any suitable manner for sweetening the coffee. The bottom of the cup may then be grasped by the fingers of the hand of the user, indicated at 34, and the cup given a rotary motion alternately clockwise and counterclockwise as viewed in Fig. 1 thereby agitating the liquid coffee in the cup and causing the coffee to impinge against the fins or baffles 26 thereby creating eddies in the coffee which stir up the sugar 32 on the plate 24 and finally dissolve the sugar.

The angular arrangement of the fins 26 is such that a positive baffling action is produced when the cup is rotated.

While we have illustrated and described the preferred embodiment of the invention it will be understood that variations thereof may be made without departing from the principle of the invention.

We claim:

A paper coffee cup comprising a hollow cylindrical tapered body having a side wall and a bottom wall and open at the top, a disc supported on the bottom wall, and upstanding fins spaced inwardly from the periphery of the disc and protruding inwardly of the body, said fins being semi-circular in configuration and spaced from each other providing passages therebetween, said fins having their surfaces perpendicular to each other whereby upon rotation of the cup by the hand of the user the coffee therein will impinge against the fins and pass therebetween creating eddies whereby sugar on the disc and surrounding the fins will be stirred and dissolved.

References Cited in the file of this patent

UNITED STATES PATENTS

| | | |
|---|---|---|
| 853,547 | Harbeck | May 14, 1907 |
| 1,989,019 | O'Keefe | Jan. 22, 1935 |
| 2,561,457 | Beales et al. | July 24, 1951 |
| 2,592,485 | Stair | Apr. 8, 1952 |
| 2,737,332 | Amberg et al. | Mar. 6, 1956 |